United States Patent [19]

Luciano et al.

[11] 4,357,386
[45] Nov. 2, 1982

[54] PAPERMAKERS FELT AND METHOD OF MANUFACTURE

[75] Inventors: William A. Luciano, Clifton Park; Steven S. W. Yook, Albany, both of N.Y.

[73] Assignee: Albany International Corp., Albany, N.Y.

[21] Appl. No.: 321,914

[22] Filed: Nov. 16, 1981

[51] Int. Cl.³ .................... D03D 23/00; B32B 5/02; B32B 5/06
[52] U.S. Cl. ...................................... 428/234; 28/107; 28/109; 28/110; 139/383 A; 428/240; 428/283; 428/300; 428/304.4; 428/311.5
[58] Field of Search .................. 28/107, 109, 110; 139/383 A, 383 AA; 428/71, 234, 235, 240, 283, 300, 304.4, 311.5

[56] References Cited

U.S. PATENT DOCUMENTS

| | | | |
|---|---|---|---|
| 3,059,312 | 10/1962 | Jamieson | 428/311.5 |
| 3,900,648 | 8/1975 | Smith | 428/71 |
| 4,182,649 | 1/1980 | Isgur et al. | 428/240 |
| 4,250,172 | 2/1981 | Mutzenberg | 428/234 |

Primary Examiner—William J. Van Balen
Attorney, Agent, or Firm—Kane, Dalsimer, Kane, Sullivan and Kurucz

[57] ABSTRACT

The disclosure is of a composite papermakers felt made up of a textile base layer, an intermediate layer of polymeric resin foam particles and a covering layer of nonwoven staple fibers. The felt is useful in the wet press section of a papermaking machine. The disclosure is also of a method of manufacturing the felt of the invention.

5 Claims, 5 Drawing Figures

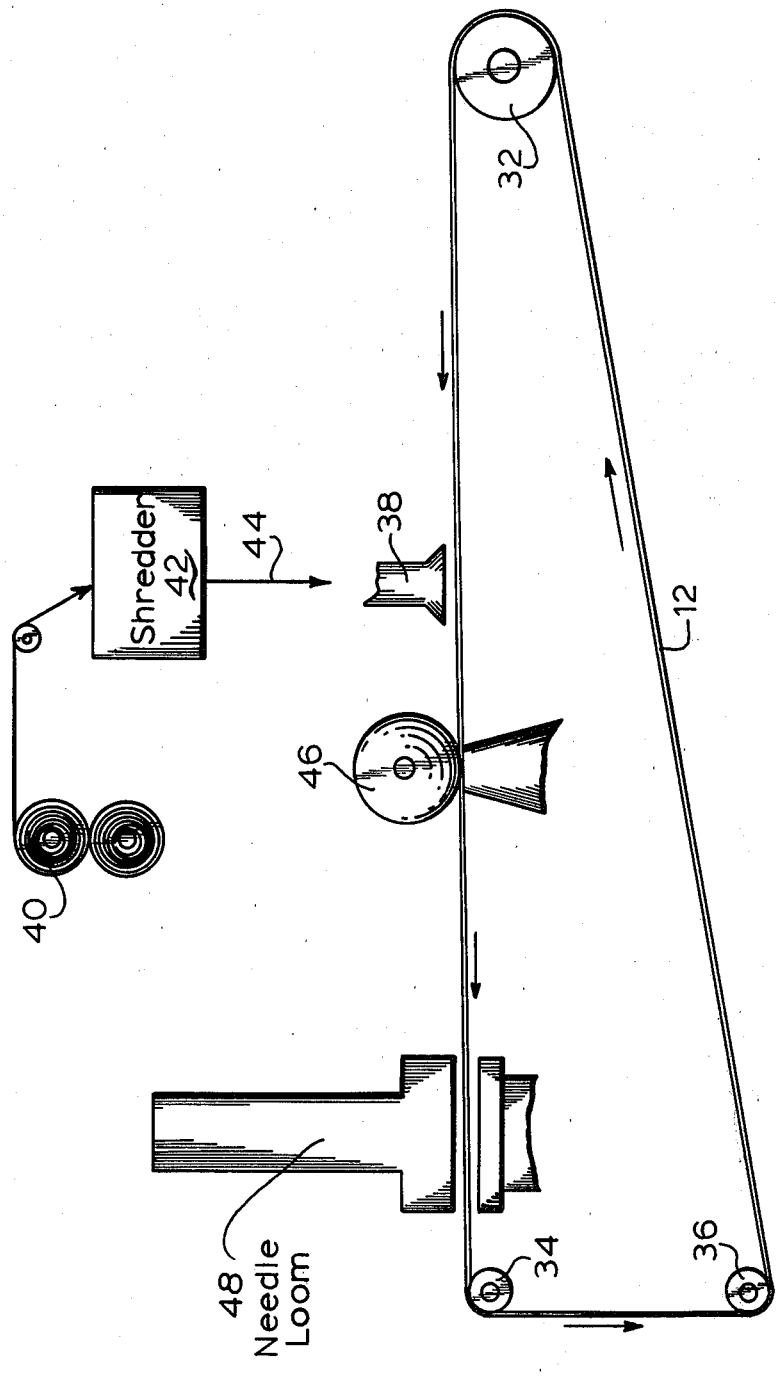

PAPERMAKERS FELT AND METHOD OF MANUFACTURE

BACKGROUND OF THE INVENTION

1. Field of the Invention

The invention relates to papermakers felts and methods of their manufacture and more particularly relates to composite felts comprising a textile base, a layer of a flexible, polymeric resin foam and a surface of needled textile fibers. The composite felts of the invention are useful in the press section of a papermaking machine.

2. Brief Description of the Prior Art

The modern papermaker employs a highly sophisticated machine to make paper, which is named rather appropriately a "papermaking machine". The modern papermaking machine is in essence a device for removing water from the paper furnish. The water is removed sequentially in three stages or sections of the machine. In the first or forming section, the furnish is deposited on a moving forming wire and water drained through the wire to leave a paper sheet or web having a solids content of circa 18 to 25 percent by weight. The formed web is carried into a wet press felt section and passed through one or more nip presses on a moving press felt to remove sufficient water to form a sheet having a solids content of 36 to 44 percent by weight. This sheet is then transferred to the dryer section of the papermaking machine where dryer felts press the paper sheet against hot, steam-heated dryer cylinders to obtain about 92 to 96 percent solids content.

The clothing employed on the paper making machine must perform a widely diverse range of functions, according to the position on the machine, i.e.; forming, press or dryer section. In view of the diversity of functions, the clothing for use in each section of the machine must be manufactured to meet specific design requirements essential to the particular section. In the absence of meeting the specific felt design requirements demanded in each section of the machine, the overall operation of the machine will be unsatisfactory. Optimum operating lives of the felts will not be achieved, product quality may be adversely affected, machine speeds may be lowered or drying efficiency may be impeded.

Those skilled in the art have long appreciated that the efficiency of water removal in the wet press section of the papermaking machine is critical to overall efficiency in the papermaking process. This is because, first a large amount of water must be removed from the sheet at the presses to realize a good drying economy. Secondly, greater efficiency in water removal creates a drier and hence stronger sheet less susceptible to breaking. A large variety of clothing constructions have been proposed as papermakers felts advantageously employed in the press section of a papermaking machine. In fact, there has been a continual evolution of clothing constructions, corresponding to improvements in the papermaking machine itself. This evolution began with the early woven felt, woven of spun yarn and then mechanically felted or fulled. A later development was found in the "Batt-on-Base" construction consisting of a woven fabric base and a batt surface attached by needling. The needled batt-on-base felts are widely used today and have been said to be the "standard of the industry". However, a wide variety of other constructions are available, including non-woven press felts.

Important physical properties of a papermakers press felt are measured by four test measurements. They are:

1. Saturated moisture: a measure of the amount of water absorbed by the felt under static conditions. Expressed as pounds of water absorbed per pound of felt, saturated moisture is an excellent indicator of the ability of a felt to receive water from the sheet in the nip.

2. Vacuum dewatering: measures the ability of a felt or fabric running on a press to release water to a suction pipe.

3. Air permeability: measured in a dry felt, is expressed as cfm/sq. ft. of felt at 0.5 in. water pressure ($m^3/m^2$ per hr. at 10 mm water gauge).

4. Flow resistance: the water permeability of the felt or fabric.

Generally, the batt-on-base felts are advantageous in all four parameters, compared to the earlier conventional woven felt. However, as the speed of the papermaking machines has increased, so has the need for press felts which show an advantage in one or more of the desired physical properties.

One type of press felt which has been suggested is a composite of a woven or non-woven fabric base bearing a surface layer of a flexible, open-cell, polymeric resin foam. This layer, acting like a sponge would enhance the removal of water from the paper sheet. In addition, the inherent thermal insulation provided by the foam layer would impart some protection to the underlying fabric structure which is normally exposed completely to the degradative, hot water being pressed from the paper sheet. These composite felts have also shown good resistance to compaction for long periods of time. Representative of the prior art concerned with the latter composite papermakers felts are the disclosures found in U.S. Pat. Nos. 1,536,533; 2,038,712; 3,059,312; 3,399,111; and 3,617,442. In general, the papermakers felts of the prior art which comprise a composite laminate of a textile and a polymeric resin layer have not been completely satisfactory in regard to their resistance to wear and delamination. Apparently, the diverse nature of the two components enhances degradation of the overall composite. Further, the presence of a seam in the foam layer serves to provide a weak point in the construction.

The composite structure of the papermakers felts of the present invention are an improvement over many of the prior art composite felts in regard to their resistance to wear and delamination. They are virtually seam free. In addition, the method of their manufacture is an improvement over prior art manufacturing processes.

SUMMARY OF THE INVENTION

The invention comprises a papermakers felt, which comprises;

a textile base layer; an intermediate layer of granular particles of a synthetic, flexible polymeric resin foam; and an upper layer for receiving a wet paper sheet, affixed to the base layer and the intermediate layer by needling, said upper layer comprising a plurality of non-woven textile staple fibers.

The invention also comprises the method of fabricating the papermakers felts of the invention.

BRIEF DESCRIPTION OF THE DRAWINGS

FIG. 3 is a flow diagram illustrating the steps in a preferred embodiment method of fabricating the papermakers felts of the invention.

DETAILED DESCRIPTION OF THE PREFERRED EMBODIMENTS OF THE INVENTION

Figure 1:
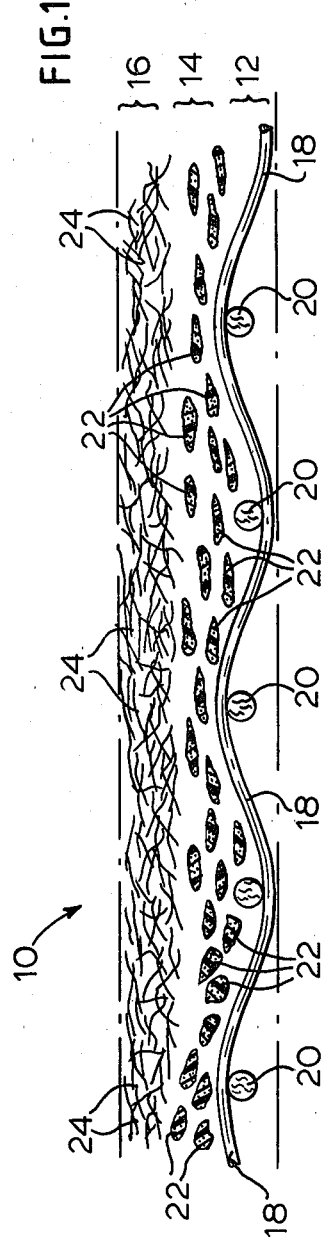
FIG. 1 is a cross-sectional, side elevation of a portion of a preferred embodiment fabric of the invention.

Representative of the papermaker's felts of the invention is the embodiment felt fabric 10 shown in FIG. 1, a cross-sectional, side elevation. The FIG. 1 shows schematically three layers in the fabric 10. The base layer 12 may be any conventional press felt fabric. As shown in FIG. 1, the base layer 12 is preferably of interwoven machine direction (warp) 18 and cross-machine direction (weft) 20 textile yarns. The yarns may be spun yarns, spun from synthetic or natural staple fibers such as staple fibers of wool, cotton, polyolefins, polyamides, polyesters, mixtures thereof and the like. Alternatively, the yarns 18, 20 may be multifilament yarns of the same synthetic or natural fiber materials.

The particular weave employed in providing the base layer 12 is not critical and any conventional felt weave may be employed including a textile base or a base layer 12 having only warp or only weft yarns. Thus, the base layer 12 may be a single layer or a multi-layered weave construction and may include filling yarns or picks to control permeability of the fabric 10.

Advantageously the denier of the yarns and the density of the weave is selected to provide a base layer 12 weight of from about 4 to about 30 oz./square yard for optimum strength.

An intermediate layer 14 consists of a plurality of discrete, granular particles 22 of a synthetic, polymeric resin foam. Preferably, the particles 22 have an average diameter of from about 0.3 to about 2 cm, most preferably about 1.25 cm. The particles 22 may be provided by chopping sheets of synthetic, flexible, polymeric resin foams. The term "foam" as used herein includes open cell foams of such synthetic polymeric resins as polyolefins such as foamed polyethylene, polyurethanes, including polyether and polyester foams, polyisocyanurate foams and the like. The method of preparing such foams and chopping them into particulate forms is well-known to those skilled in the art.

Immediately above the layer 14 of foam particles 22 is a layer 16 of non-woven, staple textile fibers 24. The layer 16 may be provided by a batt of the non-woven, staple fibers 24.

The batts may be of randomly oriented staple fibers such as synthetic polyamide, polyester, polyolefin, acrylic and like fibers including blends thereof and natural fibers such as jute and blends thereof. Optionally, if desired, the fibers may be directionally oriented within the batts by methods known to the art.

The batts of staple fibers selected for layer 16 advantageously have a weight of from about 2 to about 20 oz./square yard. The staple fibers may have a wide denier range. The batts may be preneedled using conventional techniques to obtain some integrity of the fibers prior to incorporation in the structure of fabric 10.

Figure 2:
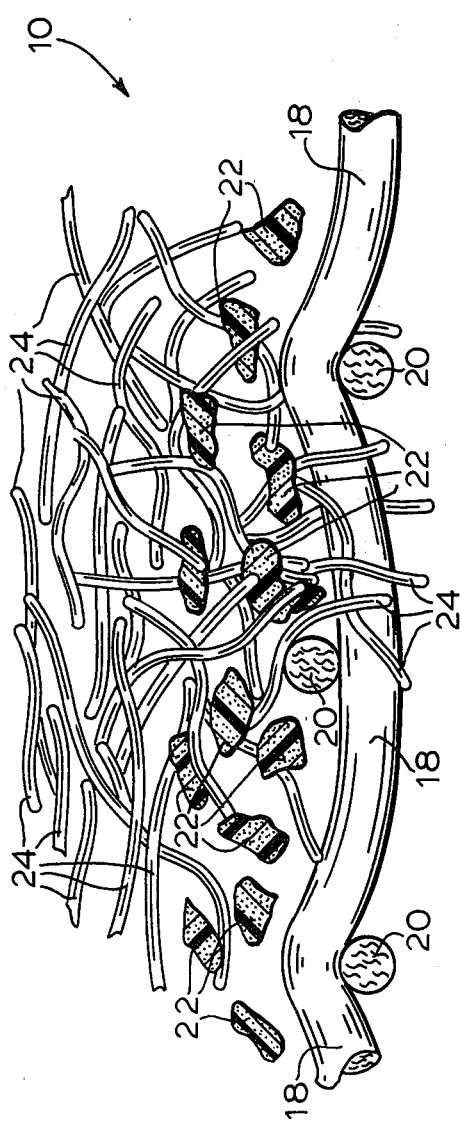
FIG. 2 is an exploded view of a portion of the fabric shown in FIG. 1.
Figure 5:
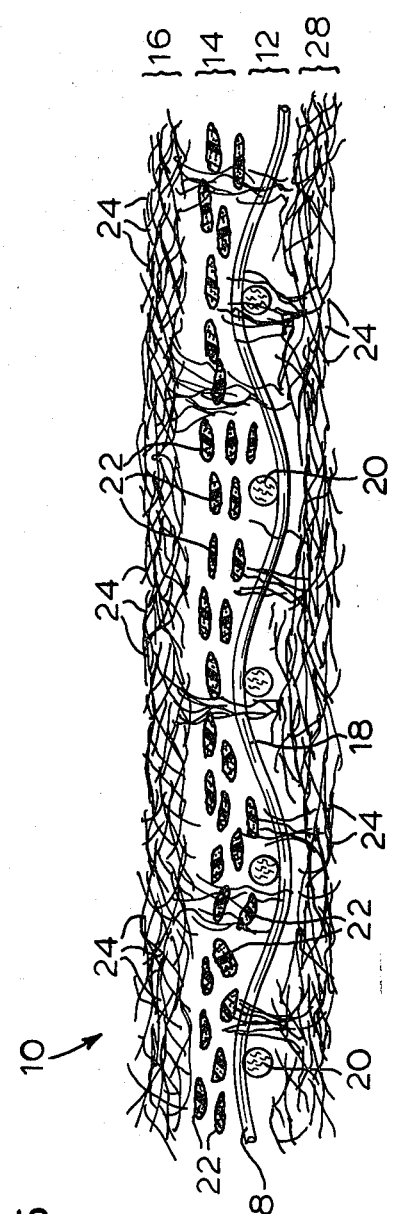
FIG. 5 is a view as in FIG. 1 but of an alternate construction fabric of the invention.

The layers 12, 14 and 16 of fabric 10, although made up of independent materials, are all integrated and consolidated into a single, uniform fabric by needling as shown best in FIG. 2, an enlarged view of a portion of the fabric 10 as shown in FIG. 1. Needling forms a dense, fibrous fabric (for illustrative purposes, only a few fibers 24 have been shown in FIG. 2 entangled with the layers 12 and 14). There is a consolidation of the three layers 12, 14, 16 through entanglement of the fibers 24 with particles 22 and yarns 18, 20. This entanglement stabilizes and holds in position the otherwise loose particles 22 so that there is a homogeneous, stable fabric 10 structure. If fibrous batts are needled to only one side of the base layer over the intermediate layer 14, fibers are carried to the opposite side of the base layer 12 to produce a light "nap" on that side, incorporating the yarns. In another embodiment of the invention, fibrous batts are also needled to the lower surface of the textile base layer 12 to produce a thicker needled fabric. A cross-sectional side elevation of this preferred embodiment is shown in FIG. 5, showing the needled bottom layer 28 of staple fibers. The embodiment fabric 10 of the present invention is a preferred construction for optimum strength, stability, water permeability and operating efficiency.

Techniques for needling composite structures are so well known that they need not be recited herein; see for example the needling techniques described in U.S. Pat. No. 2,059,132.

The coarseness of the felting needles used, the barb configurations, number, size and other variables are dependent somewhat on the degree of openness between the textile yarns, so as to avoid rupture of the textile yarns 18, 20. In general, we have found a No. 28 guage needle, with the barbs oriented so as not to tear the lengthwise yarns 18, adequate for needling. The needling frame may be fitted with either high or low density needle boards, a 34 density board being illustrative. Needling is preferably carried out to produce a needled fabric having a weight within the range of from about 20 to about 60 oz./square yard.

Referring now to FIG. 3, one may observe a flow diagram illustrating steps in a preferred embodiment method of fabricating the papermakers felts of the invention. An endless woven felt 12 as described above is mounted on tail roll 32 and passes over tension rollers 34, 36. The felt is moved endlessly in the direction shown by the arrow, passing under hopper 38 which dispenses in a uniform manner, shredded or granular particles of a synthetic, flexible polymeric resin foam such as a polyurethane foam. The hopper 38 receives the particles of foam material from rolls of foam material 40 which is granulated or shredded in a shredder 42 and passed by pneumatic lines 44 to the hopper 38. The hopper 38 is adapted to dispense an even layer of the foam particles across the surface of the felt 12. The height of the particles deposited on felt 12 may be regulated by the speed of the felt 12 underneath hopper 38. Preferably, the speed is elected so that a height of about 0.6 cm of the granular foam particles are deposited on the felt 12. As the felt 12 moves beyond hopper 38, a non-woven, fibrous batt of staple fibers is overlaid on the surface of deposited foam granules from a roll 46. The three layers, i.e.; felt 12, granulated foam particles and non-woven fibrous batts are then passed through a needle loom 48 for needling and consolidation of the three spearate layers so that they are integrated into a single, papermakers felt useful in the wet press section of a papermaking machine.

Figure 4:
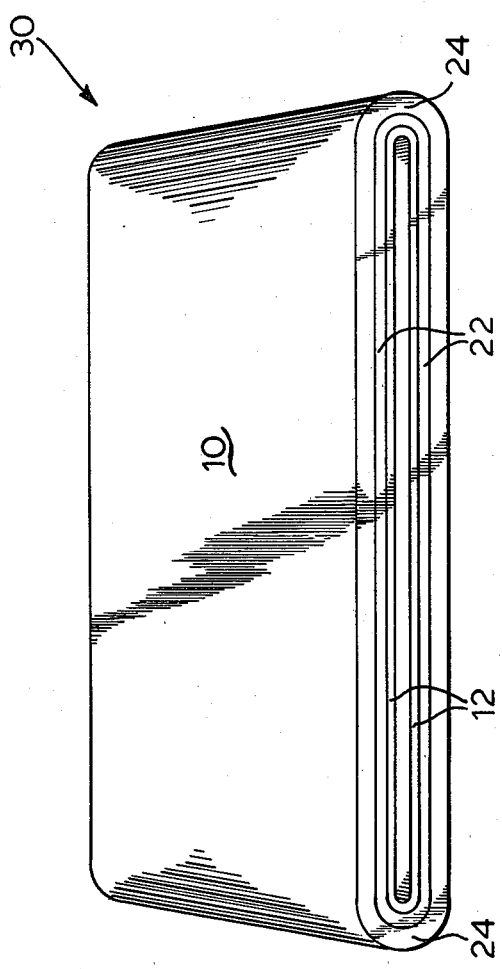
FIG. 4 is an isometric view of a wet press belt made from the fabric of FIG. 1.

Upon removal from the apparatus shown in FIG. 3, one obtains an endless papermakers belt 30 as shown in FIG. 4. It will be appreciated by those skilled in the art that by the preferred embodiment method of the invention one obtains an endless belt 30 which is essentially a seamless structure. This is particularly valuable since lack of a seam would appear to promote resistance to delamination of the layers making up the endless belt 30.

The following example describes the manner and process of making and using the invention and sets forth the best mode contemplated by the inventor of carrying out the invention but is not to be construed as limiting.

EXAMPLE 1

A woven scrim made up of interwoven machine direction and cross-machine direction yarns (1.0 oz/ft$^2$) is covered on one surface with a batt of non-woven staple fibers having a weight of 3.2 oz/ft$^2$ and the two layers and joined by needling. The uncovered surface of the resulting felt is covered with granules (average diameter of 0.125″) of a polyurethane foam at a rate of 2.26 oz/ft$^2$ and the granules are covered with a batt of the above described non-woven fibers weighing 1.2 oz./ft$^2$. The whole assembly is needled together to obtain a wet-press fabric having the following physical properties:

| weight | 7.66 oz./ft$^2$ | 1.0 base |
|---|---|---|
| density | 27.4 lb/ft$^3$ | 3.2 batt under foam |
| void volume | 61.8 as a % | 2.26 foam |
| air permeability | 4.5 cfm at .5″ H$_2$O drop. | 1.2 batt atop foam |

What is claimed is:
1. A papermakers felt, which comprises;
    a textile base layer;
    an intermediate layer of granular particles of a synthetic, flexible polymeric resin foam; and
    an upper layer for receiving a wet paper sheet affixed to the base layer and the intermediate layer by needling, said upper layer comprising a plurality of non-woven textile staple fibers.
2. The felt of claim 1 wherein said base layer also comprises a batt of staple fibers needled to the lower surface thereof.
3. The felt of claim 1 wherein said foam is an open cell polyurethane foam.
4. A papermakers felt, which comprises;
    a base layer of interwoven, machine direction (warp) and cross-machine direction (weft) textile yarns;
    an intermediate layer of granular particles of a synthetic, polymeric resin foam; and
    an upper layer for receiving a wet paper sheet affixed to the base layer and the intermediate layer by needling said upper layer comprising a plurality of non-woven textile staple fibers.
5. A method of fabricating a papermakers felt, which comprises;
    providing an endless base layer of interwoven, machine direction and cross-machine direction textile yarns;
    providing a layer of granular particles, synthetic, flexible polymeric resin foam on one surface of the base layer;
    covering the layer of particles with a batt of non-woven, staple textile fibers; and
    needling the layers together.

* * * * *